United States Patent
Lewis et al.

(10) Patent No.: US 7,107,700 B2
(45) Date of Patent: Sep. 19, 2006

(54) TAPE RULE HAVING REORIENTED MEASURING BLADE

(75) Inventors: Steven W. Lewis, 120 Washington St., Woodbury, CT (US) 06798; Robert L. Brass, 45 Calhoun St., Washington, CT (US) 06794; John F. Frega, Holmdel, NJ (US)

(73) Assignees: Robert L. Brass, Washington, CT (US); Steven W. Lewis, Woodbury, CT (US)

( * ) Notice: Subject to any disclaimer, the term of this patent is extended or adjusted under 35 U.S.C. 154(b) by 0 days.

(21) Appl. No.: 11/039,332

(22) Filed: Jan. 19, 2005

(65) Prior Publication Data

US 2006/0156572 A1 Jul. 20, 2006

(51) Int. Cl.
*G01B 3/10* (2006.01)

(52) U.S. Cl. ............................................ 33/769; 33/755

(58) Field of Classification Search .......... 33/755–759, 33/769, 761, 764, 768–770
See application file for complete search history.

(56) References Cited

U.S. PATENT DOCUMENTS

| | | | | |
|---|---|---|---|---|
| 1,402,589 A | * | 1/1922 | Farrand | 33/769 |
| 1,983,503 A | * | 12/1934 | Volz | 33/769 |
| 4,155,168 A | * | 5/1979 | DuBois | 33/32.5 |
| 4,200,983 A | * | 5/1980 | West et al. | 33/767 |

FOREIGN PATENT DOCUMENTS

JP 2002131003 A * 5/2002

* cited by examiner

*Primary Examiner*—Yaritza Guadalupe-McCall
(74) *Attorney, Agent, or Firm*—Ira S. Dorman

(57) ABSTRACT

A coilable tape rule includes a fixed structure or a roller about which the measuring blade moves during extension from the casing and which causes the blade to turn on its longitudinal axis so as to reorient its width dimension to a perpendicular relationship to the axis of coiling.

2 Claims, 6 Drawing Sheets

TAPE RULE HAVING REORIENTED MEASURING BLADE

BACKGROUND OF THE INVENTION

It is often desirable to place the casing of a tape rule at a certain position with the measuring blade extended so as to enable measurements to be made at remote locations, and to do so without need for holding the casing. In the conventional tape rule the blade pays out through a peripheral aperture, and is oriented with its width dimension corresponding to that of the casing. Even if the casing has straight, flat edge sections on which it can be supported, therefore, standing the casing on edge (as must be done if the indicia on the face of the blade are to be visible) affords a very low level of stability. If left unattended, there is a likelihood that the rule casing will tip over, particularly if the extended blade is disturbed in any way, thus not only making it difficult to read the distance scale but, indeed, making the measurement itself unreliable due to displacement of the rule from its original position.

SUMMARY OF THE INVENTION

Accordingly, it is the broad object of the present invention to provide a novel coilable tape rule wherein the casing provides stable support and enables self-standing positioning, with the blade extended, with minimal concern for inadvertent displacement from a selected location.

A more specific object of the invention is to provide such a tape rule in which the measuring blade is reoriented, as it is extended from the casing, to a relationship in which its width dimension is nonparallel, and normally substantially perpendicular, to the axis of coiling.

An additional object of the invention is to provide a novel coilable tape rule having a unique brake mechanism for maintaining the blade at selected positions of extension from the casing.

It has now been found that certain of the foregoing and related objects of the invention are attained by the provision of a coilable tape rule comprising: a casing having an aperture to the interior thereof; means for mounting a coiled measuring blade within the rule casing for extension therefrom and retraction thereinto through the aperture; a flexible (normally, resilient) measuring blade mounted upon the means for mounting, the measuring blade having a length dimension and a transverse width dimension and being coilable about an axis of blade coiling, within the casing, with its width dimension oriented parallel to the axis of coiling; and reorienting means for turning, or rotating, the measuring blade on its longitudinal axis so as to reorient the width dimension to a nonparallel relationship to the axis of coiling as the measuring blade is extended from said casing.

In most instances the nonparallel relationship of the measuring blade width dimension will be substantially perpendicular to the axis of coiling, achieved by effecting a quarter (i.e., 90°) turn, and the casing will comprise at least one wall having an effectively planar outside surface to which the axis of coiling is normal and to which the width dimension of the turned portion of the measuring blade is substantially parallel. The reorienting means incorporated into the tape rule may comprise transition structure disposed within the casing and providing a transition surface on which the measuring blade is supported during passage from the means for mounting toward the aperture of the casing. The transition structure may be fixed within said casing, to slidably support the measuring rule on its transition surface, or the transition surface may be on a roller member mounted within the casing; in either case, the transition surface will desirably be smoothly curvilinear. The reorienting means may also comprise channel-defining structure disposed within the casing and dimensioned and configured for slidably receiving and constraining the measuring blade. Such channel-defining structure will generally lead to the aperture of the casing, and it may function cooperatively with transition structure by slidably receiving the blade as it passes from the transition surface.

The means for mounting, employed in the tape rule, will usually comprise a spool for coilably receiving the measuring blade and being mounted for rotation about the axis of coiling. The casing will usually comprise a pair of spaced, substantially parallel sidewalls and a peripheral wall extending therebetween and thereabout, with the axis of coiling of the blade being oriented substantially normal to the sidewalls and with the aperture being formed through the peripheral wall. The measuring blade will normally be of concavo-convex transverse cross section, in its free state, and the measurement indicia (distance scale) on the extended portion of the measuring blade will normally face upwardly when the tape rule is supported from beneath; i.e., the indicia-bearing face of the blade will be directed oppositely to the outside surface of the casing on which the casing rests.

In most instances the tape rule will additionally include a brake mechanism, operative for releaseably securing the measuring blade in positions extended from the casing. In one form the brake mechanism will comprise: a locking piece pivotably mounted in the casing adjacent the reorienting structure provided, and having an operating arm and a locking tab thereon, the locking tab extending generally radially from the axis of pivoting of the locking piece for movement toward and away from the transition structure and being positioned for pinching engagement of the measuring blade, disposed between the locking tab and the transition structure, against the transition surface when the locking tab is moved into close proximity thereto; and a toggle piece mounted for pivoted movement about an axis parallel to the axis of pivoting of the locking piece, such that pivoting in one direction will cause the toggle piece to act upon the operating arm of the locking piece so as to bring the locking tab into stable pinching engagement with the measuring blade, and pivoting in the opposite direction will cause the toggle piece to act upon the operating arm so as to displace the locking tab for release of the measuring blade. The toggle piece and the operating arm of the locking piece will advantageously have latching elements thereon disposed for operative interengagement during pivoting of the toggle piece in the "opposite direction," so as to effect such displacement of the locking tab. In particular, the latching element on the toggle piece may be a hook and the latching element on the locking piece may be a pin on the operating arm thereof. Although a manual (e.g., crank-operated) blade-retraction and rewinding mechanism may be employed, the tape rule of the invention will usually include power means for effecting return of the extended portion of the measuring blade into the casing. Such power means will normally comprise a spring that applies constant retracting force to the mounting spool.

DETAILED DESCRIPTION OF THE ILLUSTRATED EMBODIMENTS

Figure 1:
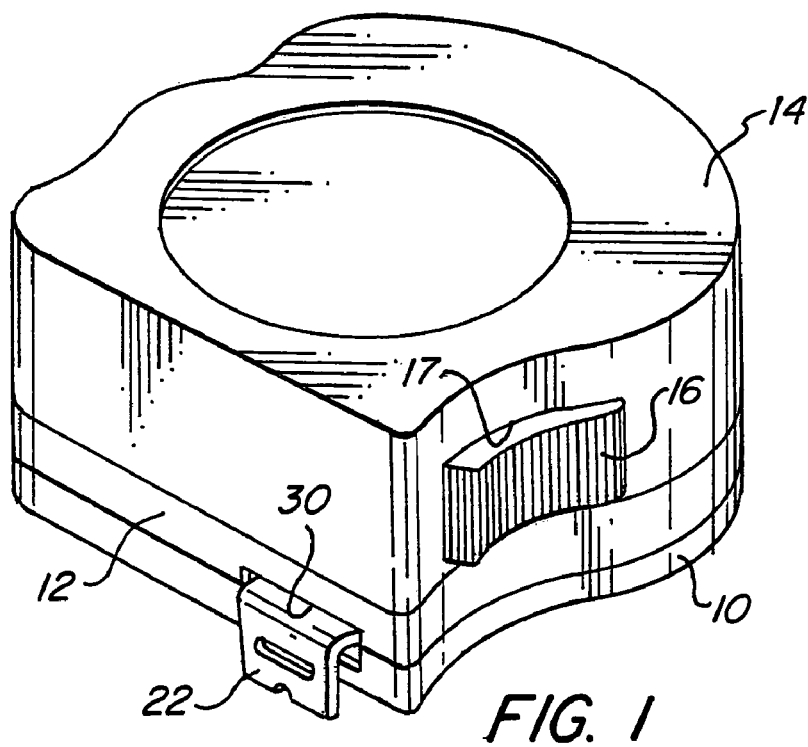
FIG. 1 of the drawings is a front perspective view of one form of coilable tape rules embodying the present invention.
Figure 2:
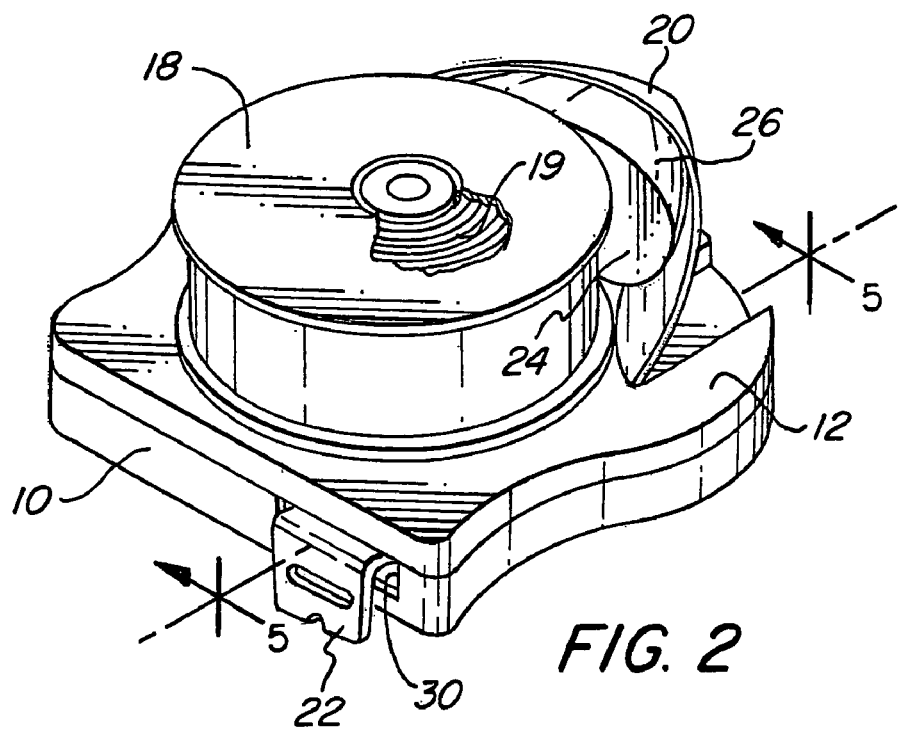
FIG. 2 is a front perspective view of the tape rule of FIG. 1, from which the casing cover has been removed to expose internal features, a section of the spool within the casing being broken away to expose a further feature.

Turning initially to FIGS. 1 through 5 of the drawings, therein illustrated is a first form of coilable tape rules embodying the present invention and consisting of a casing base, comprised of an outer wall 10 and an inner plate 12, and a casing cover 14. A slide 16 for operating the brake mechanism (not illustrated) projects through an opening 17 defined in the peripheral wall of the cover 14, which brake mechanism serves of course to maintain the blade 20 in selected positions of extension against the retractive force of the power-return spring 19, constantly applied to the spool 18 on which the blade 20 is wound. The blade 20 is of course of great length relative to its width dimension, taken with respect to which dimension it is of concavo-convex cross-sectional form, as is conventional; it also terminates in a standard engagement hook 22.

Figure 3A:
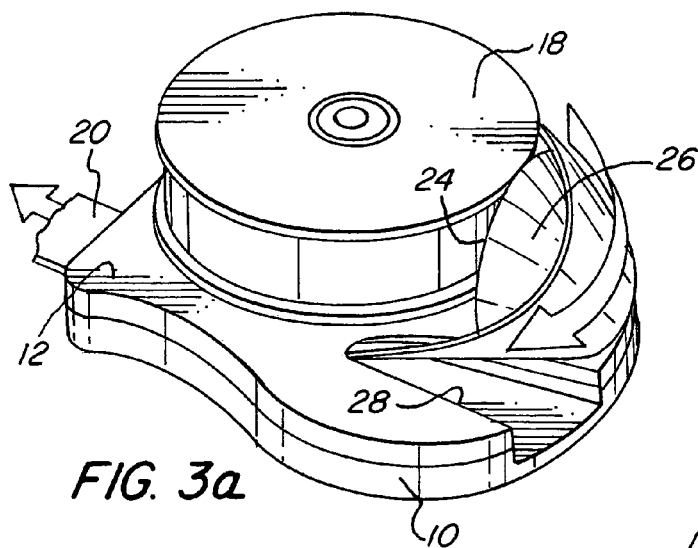
FIGS. 3a and 3b are fragmentary rear perspective views showing the relationship of the measuring blade to the reorienting transition structure provided within the rule.
Figure 3B:
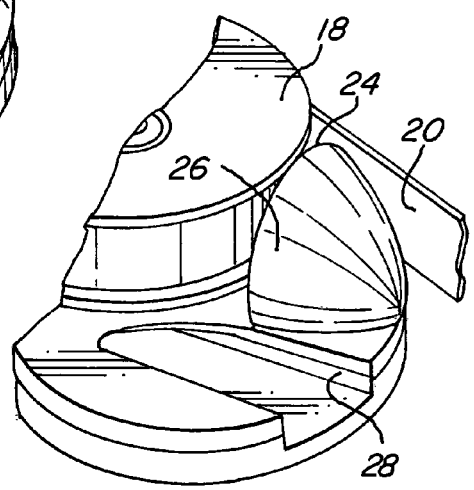
Figure 4A:
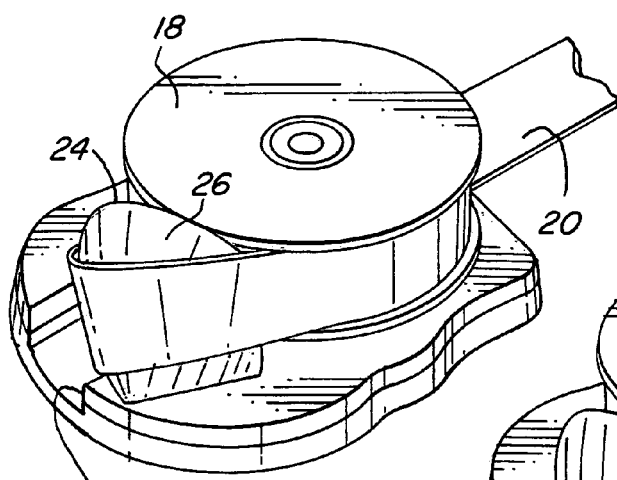
FIGS. 4a and 4b are similar views, taken from a different angle.
Figure 4B:
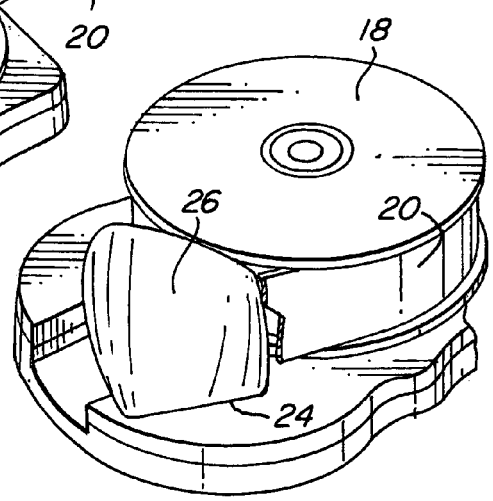
Figure 5:
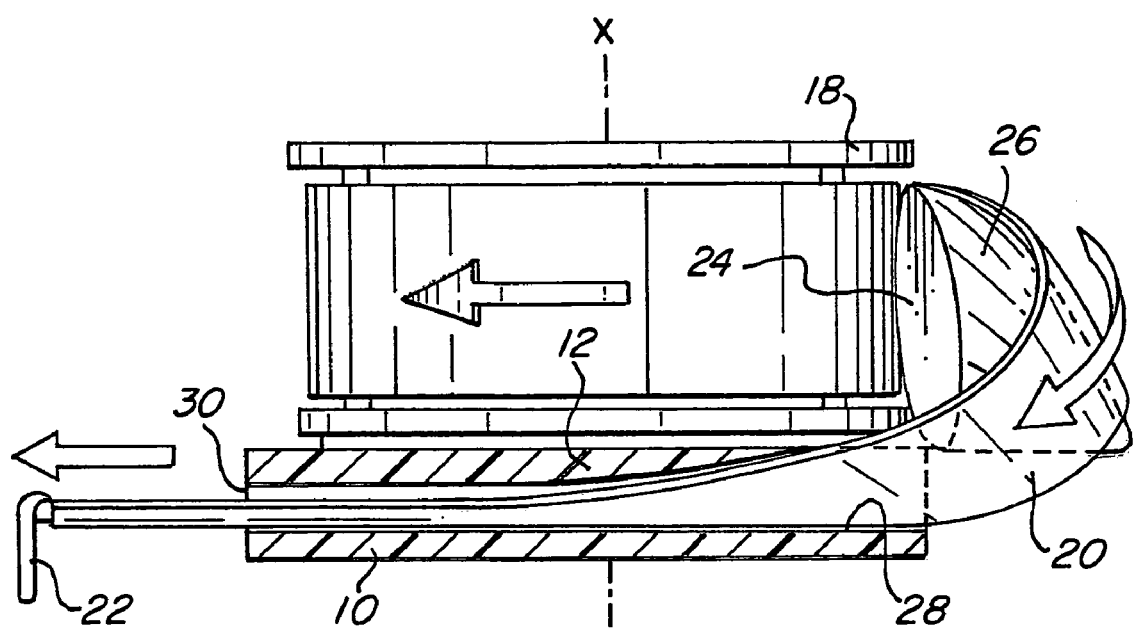
FIG. 5 is an elevational view of the tape rule of the foregoing figures, taken along line 5—5 of FIG. 2.
Figure 6:
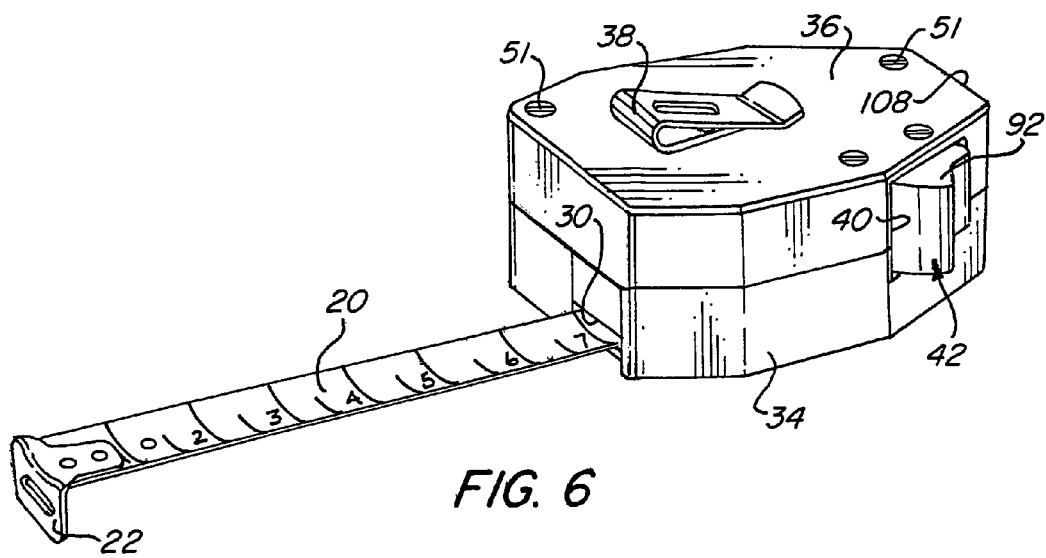
FIG. 6 is perspective view of a second form of coilable tape rules embodying the present invention, showing the measuring blade partially extended from the casing.
Figure 7:
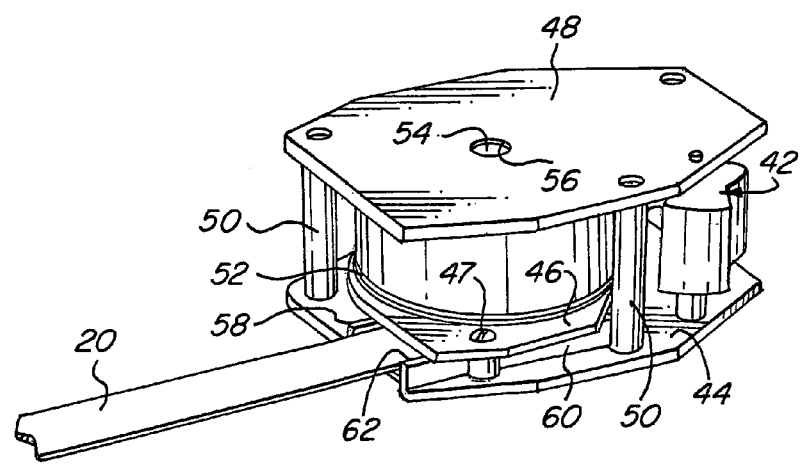
FIG. 7 is a similar view of the tape rule of FIG. 6, from which housing pieces have been removed.

As is perhaps best seen in FIGS. 3 through 5 of the drawings, upon passage from the spool 18 the measuring blade 20 wraps partially about the transition structure 24, reversing its direction and also changing its widthwise orientation by gradually effecting a quarter turn of the blade on its longitudinal axis, as it traverses the rounded, generally conic surface 26. Thus, the blade 20 is reoriented from a relationship in which its width dimension is parallel to the coiling axis "X" to one in which, upon exiting the casing, it is perpendicular thereto. It can be seen that such reorientation is only partially achieved as the blade leaves the surface 26, and is completed during passage through the channel 28, formed by the outer wall 10 and the plate 12, due largely to the constraints imposed by the latter component.

Turning now in detail to FIGS. 6 through 10 of the drawings, therein illustrated is a second form of coilable tape rules embodying the present invention, wherein the casing includes bottom and top shells, or housing parts, 34 and 36. The housing parts 34, 36 cooperatively define an opening 40 in the peripheral wall structure, formed by mating (unnumbered) skirt portions, through which opening projects a brake-operating toggle piece, generally designated by the numeral 42; a conventional belt clip 38 is attached to the housing part 36.

Disposed within the casing of the tape rule are a bottom plate 44 and an intermediate plate 46, fastened to one another by screws 47, and a top plate 48; the top and bottom plates 44, 48 are mutually spaced by three posts 50, secured by screws 51. It will be appreciated that the bottom and top plates 44, 48 may themselves comprise the housing parts 34, 36, such as by forming integral skirt portions thereon, and that such a construction may be preferred in many instances. The casing has a flat peripheral supporting surface 108 at the end opposite to that in which the aperture 30 is formed, which enables relatively stable seating of the tape rule, on end, with the blade 20 upwardly extended.

A spool 52, for storage of the coiled measuring blade 20, is rotatably mounted between the intermediate plate 46 and the top plate 48. For that purpose, stub axles 54 (only one of which is visible) project from opposite sides of the spool 52 and are journalled in the holes 56 formed through the plates 46, 48.

A pair of low, parallel wall sections 58, 60 are formed on the inside surface of the bottom plate 44 and define the sides of a channel 62. A roller member, generally designated by the numeral 64, is rotatably mounted between the intermediate plate 46 and the top plate 48 and includes a wheel portion 65 which has a surface 66 that is curvilinear in the diametric and transaxial planes. Stub axles 68 and 70 extend from the opposite sides of the wheel portion 65, and are received, respectively, in holes 72 and 74 formed through plates 48, 46 to thereby rotatably mount the roller member 64.

As can be seen (especially from FIGS. 9 and 10), upon leaving the spool 52 the measuring blade 20 passes initially about the roller 64, in engagement with the transition surface 66 thereof, and then enters the channel 62, cooperatively defined by the bottom plate 44 and the intermediate plate 46 (in addition to the parallel wall sections 58, 60); the channel 62 leads to the aperture 30 in the peripheral wall of the casing.

As in the first embodiment described, in passing from the spool 52, with its width dimension parallel to the axis of rotation, the blade 20 is redirected, and gradually reoriented, by movement over the roller member 64 and into the channel 62, so that upon exit from the casing its orientation is perpendicular to the axis of coiling (and parallel to the plates 44, 46, 48, as well as the flat exterior surfaces provided on the casing housing parts 34, 36). It will be appreciated that one advantage of using the roller member 64, rather than stationary transition structure, is that the rotating roller reduces friction and avoids rubbing and binding, as would tend to inhibit smooth operation and produce wear on the blade surfaces (which is of course especially undersirable on the indicia-bearing side).

Figure 8:
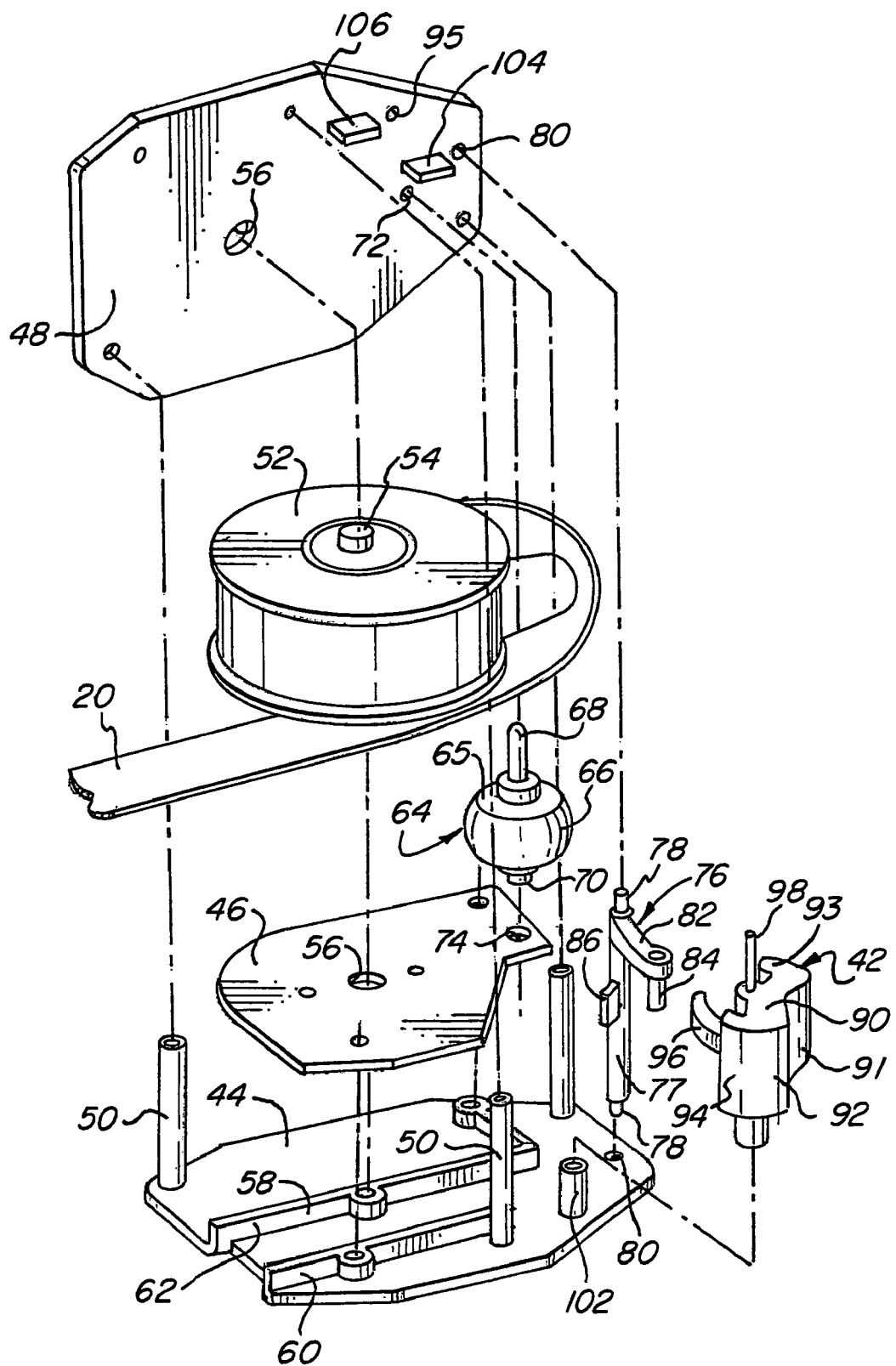
FIG. 8 is an exploded perspective view showing the internal components of the tape rule of FIGS. 6 and 7.
Figure 9:
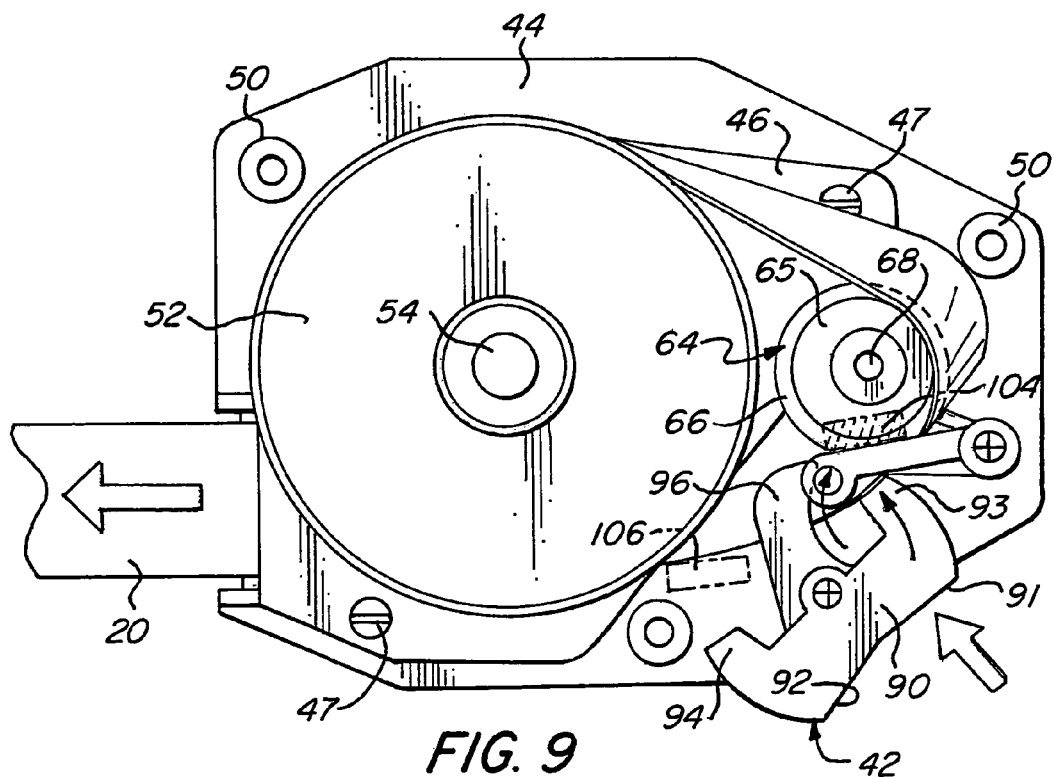
FIGS. 9 and 10 are plan views of the tape rule of FIGS. 6 through 8, illustrating operation of the brake mechanism employed therein.
Figure 10:
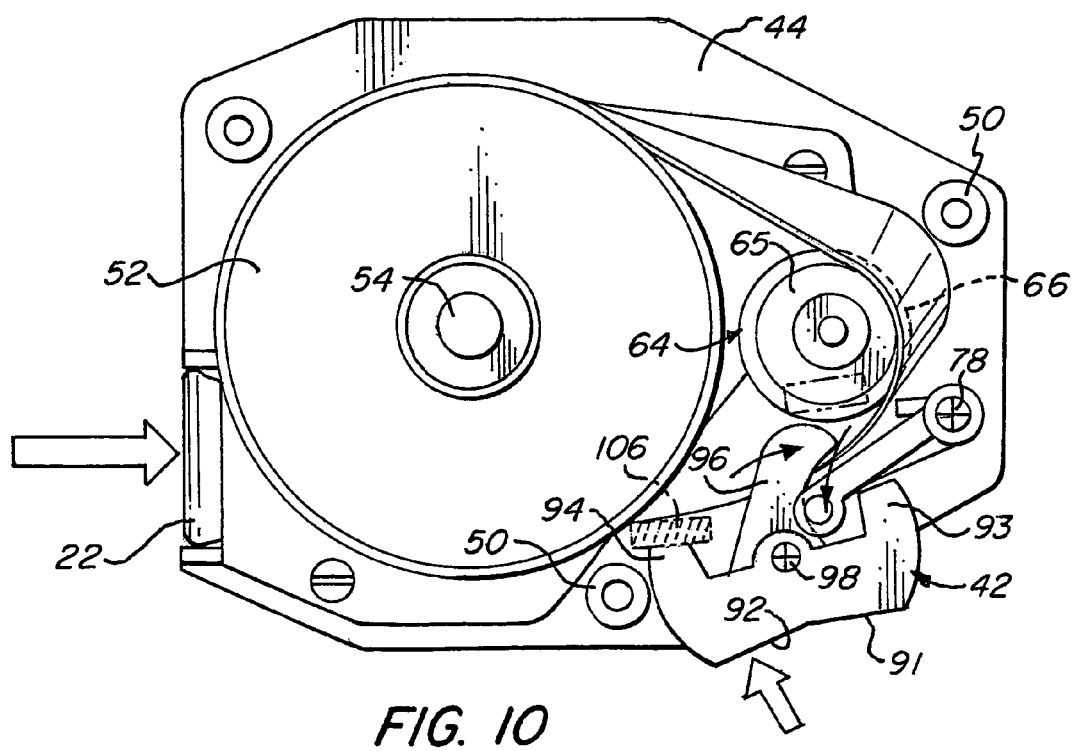

FIGS. 8 through 10 also depict, in greater detail, the brake mechanism that is provided in the tape rule. In addition to the toggle piece 42, the mechanism includes a locking piece, generally designated by the numeral 76, comprised of a shaft 77 having reduced-diameter opposite end portions 78 engaged in holes 80 in the bottom and top plates 44, 48 to mount the locking piece 76 for pivotal movement on an axis parallel to the axes of rotation of the spool 52 and the roller member 64. An actuating arm 82 extends generally radially from the shaft 77 of the locking piece 76, and supports a downwardly extending pin 84 at its free outer end. A locking tab 86 projects radially from a central location on the shaft 77, and is positioned for movement, by pivoting of the locking piece 76, toward and away from the surface 66 of the wheel 65 on the roller member 64.

The toggle piece 42 consists of a body 90 having wing portions 91, 92 with gently divergent sloped surfaces for receiving finger pressure, and ear portions 93, 94 which project inwardly from the wing portions 91, 92 and are disposed to opposite sides of the axis of pivoting; the toggle piece is pivotably mounted on a pin 98 having opposite ends received in the hole 95 and the bore of the short post 102 on the top and bottom plates 48, 44, respectively. A hook element 96 extends inwardly from the body 90 of the toggle piece 42, and two stop elements 104, 106 depend from the underside of the plate 48.

Operation of the brake mechanism is as follows: Pressing upon the wing portion 91 of the toggle piece 42, as indicated by the open arrow in FIG. 9, effects pivoting in the counterclockwise direction and causes the ear portion 93 to bear upon the arm 82 of the pivot piece 76, and thereby to rotate the pivot piece 76 in the clockwise direction, as limited by the stop element 104. Doing so brings the locking tab 86 into engagement with the rule blade 20, pinching it against the surface 66 of the roller wheel 65 and thereby locking the blade 20 against further movement inwardly or outwardly of the casing.

To effect release of the brake, the wing portion 92 is pushed inwardly (as indicated by the open arrow in FIG. 10), causing the toggle piece 42 to rotate in the clockwise direction. The hook portion 96 is thereby caused to engage the depending pin 84 on the arm 82, pivoting the locking piece 76 in the counterclockwise direction (as limited by abutment of the ear portion 94 against the stop element 106) and, in turn, moving the tab 86 away from the wheel 65 and out of contact with the blade 20. That of course releases the blade 20 and permits retraction of its extended portion, which occurs automatically under the force of a power-return motor (not shown, but, typically taking the form of the spring 19 depicted in FIG. 2).

It will be appreciated that the various parts and components of the coilable tape rule disclosed herein may be made of metal or plastic, as will be evident to those skilled in the art; the measuring blade will usually be made of steel, often with a plastic coating. It will also be appreciated that many variations in the form, combination, and arrangement of the parts and components of the instant tape rule can be made without departure from the concept and definition of the invention. For example, although measuring blade guide channels have been described herein for use in combination with other transition structures, channel-defining structure may be so formed as to alone produce the required reorientation of the blade. Also, while the transition means described serves to gradually rotate the blade through a quarter turn on its longitudinal axis, other angles of reorientation, and more abrupt turning, may be desirable in certain cases.

Thus it can be seen that the present invention provides a novel coilable tape rule wherein the casing affords stable support and enables self-standing positioning, with the blade extended, with minimal concern for inadvertent displacement from a selected location. The invention provides, more specifically, a coilable tape rule in which the measuring blade is reoriented, as it is extended from the casing, to a relationship that is nonparallel, and normally perpendicular, to the axis of coiling. The invention also provides a unique brake mechanism for maintaining the blade at selected positions of extension from the casing.

What is claimed is:

1. A coilable tape rule, comprising: a rule casing comprised of at least one wall having an exterior surface, and a peripheral wall extending about said at least one wall, said peripheral wall having an aperture to the interior of said casing; means for mounting a coiled measuring blade within said rule casing for extension therefrom and retraction thereinto through said peripheral wall aperture; a flexible measuring blade mounted upon said means for mounting, said measuring blade having a length dimension and a transverse width dimension and being coilable about an axis of coiling in said casing normal to said exterior surface of said at least one wall and with said width dimension of said measuring blade oriented parallel to said axis of coiling; and reorienting means for turning said measuring blade through about a quarter turn on its longitudinal axis so as to reorient said width dimension to a substantially perpendicular relationship to said axis of coiling as said measuring blade is extended from said casing; said reorienting means comprising channel-defining structure disposed within said casing inwardly of said aperture and dimensioned and configured for slidably receiving and constraining said measuring blade.

2. The tape rule of claim 1 wherein said reorienting means further comprises transition structure disposed within said casing and providing a transition surface on which said measuring blade is supported during passage from said means for mounting; and wherein said channel-defining structure slidably receives said blade, passing from said transition surface, and leads to said aperture of said casing.

\* \* \* \* \*